United States Patent
Bayle

[11] 3,844,181
[45] Oct. 29, 1974

[54] RACK AND PINION ASSEMBLY

[75] Inventor: Robert Vincent Bayle, Ecquevilly, Yvelines, France

[73] Assignee: Gemmer France, Suresnes, Hauts-de-Seine, France

[22] Filed: Apr. 4, 1973

[21] Appl. No.: 347,889

[30] Foreign Application Priority Data
Apr. 10, 1972  France .............................. 72.12515

[52] U.S. Cl. .................................... 74/498, 74/422
[51] Int. Cl. ............................ F16h 1/04, B62d 1/20
[58] Field of Search ............................ 74/422, 498

[56] References Cited
UNITED STATES PATENTS

| | | | |
|---|---|---|---|
| 3,623,379 | 11/1971 | Bradshaw et al. ..................... | 74/498 |
| 3,630,099 | 12/1971 | Miyoshi ............................... | 74/498 |
| 3,745,850 | 7/1973 | Bayle .................................. | 74/498 |

FOREIGN PATENTS OR APPLICATIONS
946,501   1/1964   Great Britain ....................... 74/498

Primary Examiner—Leonard H. Gerin
Attorney, Agent, or Firm—Hill, Gross, Simpson, Van Santen, Steadman, Chiara & Simpson

[57] ABSTRACT

Rack and pinion assemblies especially for automotive steering gear with a spring biased plastics yoke slidably supporting the rack bar in a pinion housing to hold the toothed rack portion of the rack bar in fully meshed engagement with the pinion teeth. The pinion housing has a cylindrical bore slidably supporting circumferentially spaced bearing portions of the plastics yoke with an interference fit and the yoke has a recessed head embracing the side of the rack bar opposite the pinion equipped with lubricant storage chambers and a passageway connects the bottom of the recess with the housing chamber underlying the head.

11 Claims, 4 Drawing Figures

RACK AND PINION ASSEMBLY

BACKGROUND OF THE INVENTION

1. Field of the Invention

This invention relates to the art of supporting the rack bars of rack and pinion assemblies and particularly deals with a plasticsyoke support and bearing embracing the side of the rack bar opposite the pinion in a pinion housing and urging the toothed rack of the rack bar into fully meshed engagement with the pinion teeth.

2. Description of the Prior Art

Rack bar supporting yokes or bearings have heretofore been loosely mounted in pinion housings to permit axial displacement as by means of a compression spring. The permissive axial displacement of a yoke in an automotive rack and pinion steering gear is limited generally to a maximum of 0.15 mm to avoid separation of the rack and pinion teeth. Thus, the yoke could shift both radially and axially relative to the pinion housing resulting in noises due to lateral displacements of the rack bar and creating impact shock loads of the yoke on the housing. The rattle noises are especially enhanced when the yoke and the housing are both composed of metal.

SUMMARY OF THE INVENTION

According to this invention the heretofore encountered rattle noises and impact shock loads permitted by the prior known yoke supports for the rack bars of rack and pinion assemblies are eliminated with a rigid but somewhat resilient plasticsyoke that cannot be laterally displaced in the pinion housing and at the same time is capable of being axially displaced as to accommodate wear and maintain the rack and pinion teeth in full meshed relationship. The plasticsyoke has circumferentially spaced bearing areas engaging a bore of the pinion housing with an interference fit and separated by portions spaced from the bore wall.

Wide tolerance variations in bore and yoke diameters are accommodated without causing looseness or rattling of the yoke in the bore and the pinion housing may be a rough casting with a yoke receiving bore of varying diameter. The interference fit also damps out vibrations of the rack bar.

In the preferred embodiment, the plasticsyoke has a recessed head embracing the side of the rack bar opposite the pinion and rack teeth with a skirt depending from the head having four circumferentially spaced bearing areas in diametrically opposed pairs engaging a cylindrical bore of the pinion housing with an interference fit and separated by four flats spaced from the bore wall. The diameter between the opposed bearing areas of each pair is greater than the diameter of the bore so that the plastics material from the bearing areas will be somewhat deformed to flow into the spaces provided by the flats. This arrangement eliminates any lateral shifting of the yoke in the bore and at the same time permits the yoke to slide axially in the bore. A compression spring engages the bottom of the yoke head and is surrounded by the skirt. The end of the skirt is bottomed on a housing cover closing the bore. The recessed head of the yoke has a central passage therethrough joining the bottom of the recess with the interior of the skirt and a pair of blind end recesses or axial wells are disposed on each side of the bore to store lubricant.

Preferred plastics for the yoke are polyurethanes, polyethylenes, and acetal resins. Particularly acceptable elastic but yet rigid synthetic resins are sold commercially under the trademark, "MANOLINE" and under the trademark, "DELRIN" sold by E. I. Dupont de Nemours and Co., Inc.

It is then an object of this invention to provide a rack and pinion assembly with an improved yoke construction for maintaining the rack and pinion units in properly meshed relationship.

Another object of this invention is to provide an automotive rack and pinion steering gear with a plastics yoke or bearing holding the rack bar so that its teeth will always be maintained in proper engagement with the pinion teeth and preventing lateral shifting or "rattling" of the yoke member.

A specific object of the invention is to provide a rack and pinion steering gear with a plastics yoke or bearing spring-loaded against the rack bar and slidable axially with an interference fit in a bore of the pinion housing.

Another object of the invention is to provide an improved yoke for rack and pinion steering assemblies which will not shift laterally in the pinion housing regardless of wide variations in dimensions of both the yoke and the bore in which it slides.

Another object of the invention is to provide a plastics bearing yoke for rack and pinion steering gear with a recessed head portion for embracing the rack bar, a depending skirt having circumferentially spaced external bearing areas separated by nonbearing areas and having lubricant storage chambers in the recess of the head.

Other and further objects of this invention will be apparent to those skilled in this art from the following detailed description of the annexed sheets of drawings, which by way of a preferred example, show one embodiment of the invention.

ON THE DRAWINGS

BRIEF DESCRIPTION OF THE PREFERRED EMBODIMENT

Figure 1:
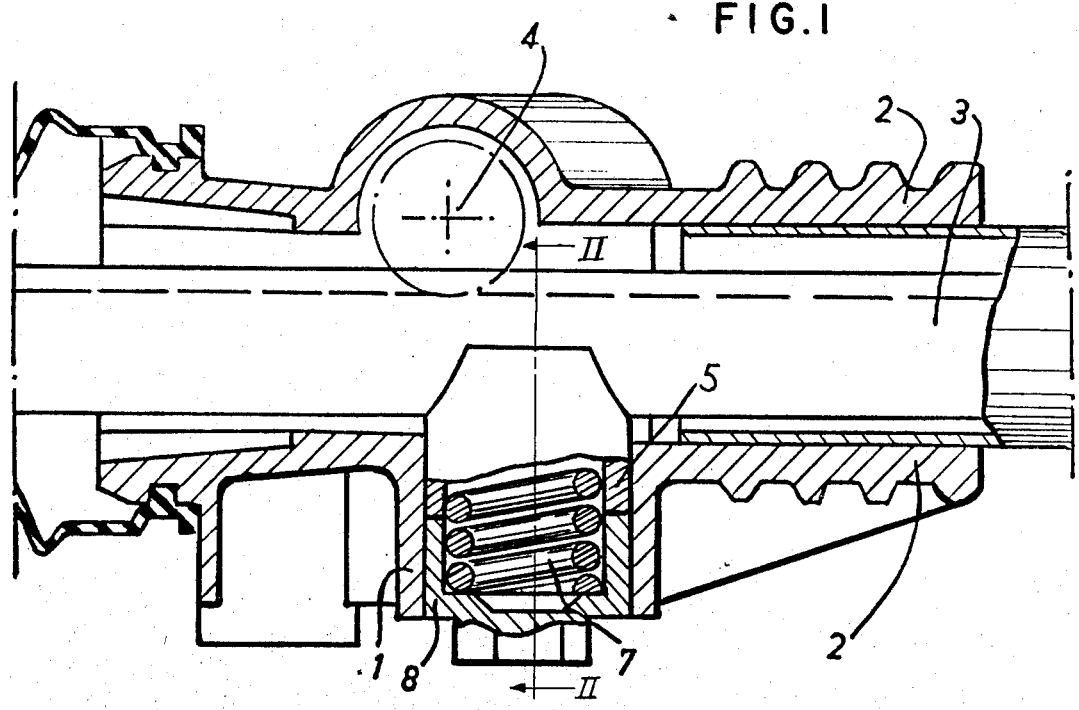
FIG. 1 is a fragmental longitudinal sectional view, with parts in side elevation of a rack and pinion automotive steering gear according to this invention.
Figure 2:
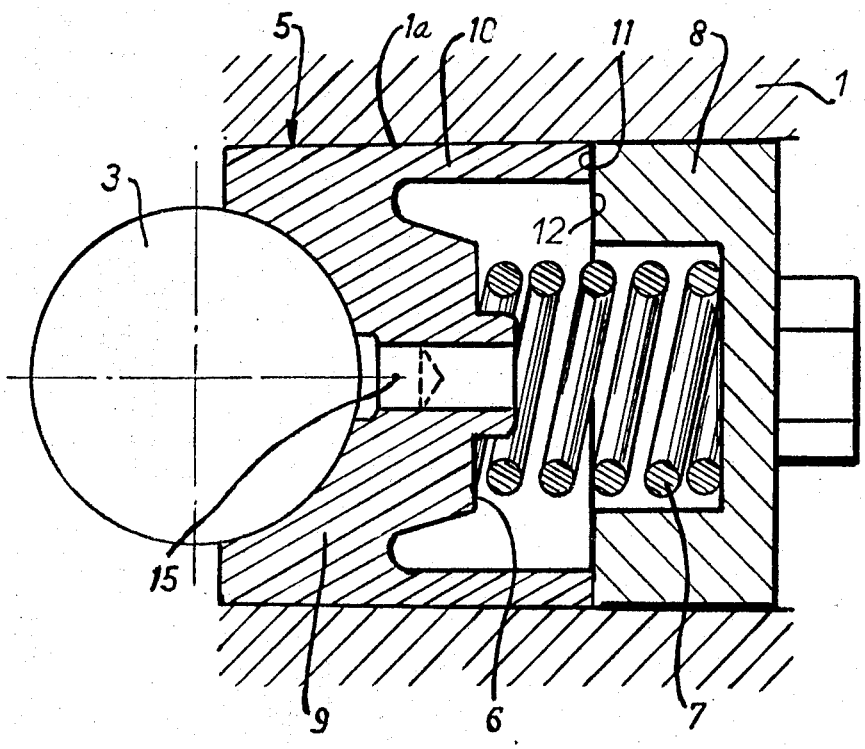
FIG. 2 is an enlarged transverse sectional view of the yoke portion of the assembly of FIG. 1; taken generally along the line II—II of FIG. 1.
Figure 3:
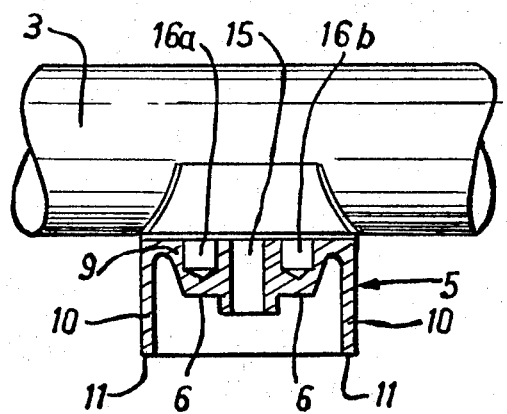
FIG. 3 is a fragmentary side elevational view of the assembly of FIG. 1 with parts omitted and with parts of the yoke in vertical section.

In FIGS. 1 to 4 the rack and pinion assembly of this invention includes a cylinder 1 integrally depending from a cast metal pinion housing or casing 2. The cylinder 1 has an internal cylindrical wall or bore 1a extending axially therethrough This casing 2 has a longitudinal open ended passage therethrough freely receiving the rack bar 3 which projects from one end of the housing sealed by a flexible boot and extends through a tube secured in the other end of the housing. A toothed driving pinion 4 is rotatably mounted in the housing or casing 2 on the side thereof opposite the depending cylinder 1.

A rigid but somewhat resilient plastics yoke or bearing 5 is slidably mounted in the bore of the depending cylinder 1 and has an internal shoulder 6 engaged by a compression spring 7 which is bottomed in the recess of a cover or closure cap 8 secured in the open end of the casing cylinder portion 1.

The yoke 5 has a head 9 recessed and shaped to embrace the bottom portion of the rack bar 3 in snug sliding bearing relation therewith. A skirt 10 depends from the head 9 and has a bottom annular end edge 11 bottoming on the annular terminal end edge 12 of the cap or cover 8 when the head 9 is forced by the rack bar 3 against the maximum load of the spring 7. The teeth of the pinion 4 are generally helicoidal and meshed with the teeth of the rack portion of the rack bar so that a maximum driving force could deflect the rack bar downwardly to bottom the yoke skirt on the cover 8.

Figure 4:
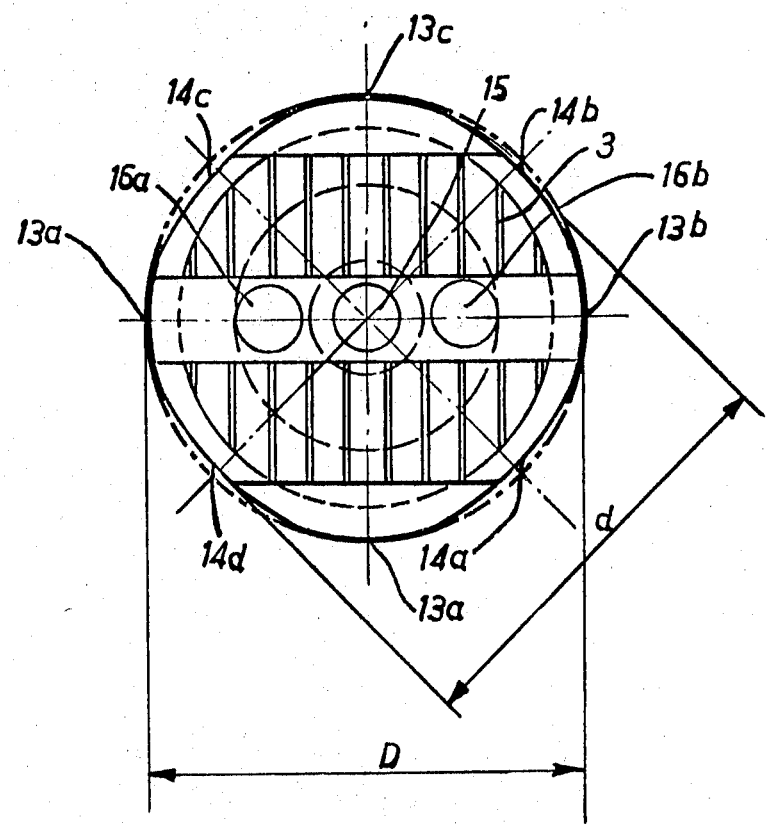
FIG. 4 is an enlarged plan view of the yoke of FIGS. 1 to 3 illustrating how it fits in the bore of the pinion housing.

According to this invention, the yoke 5 is not a complete cylinder conforming with the cylindrical bore of the portion 1 of the pinion housing. Thus, the periphery of the yoke 5 has four circumferentially spaced rounded boss portions or bearing areas 13a, 13b, 13c and 13d separated by flats 14a, 14b, 14c and 14d. The bosses are arranged in two diametrically opposite pairs so that the diameter D as shown in FIG. 4 between each pair is greater than the diameter of the bore of the cylinder 1 while the diameter d between the pairs of opposite flats is less than the bore diameter.

Thus, the yoke 5 is preformed for an interference fit in the bore of the cylinder 1 and any looseness or lateral displacement of the yoke in this bore is prevented. The bosses or bearing areas 13a, 13b, 13c and 13d are slightly deformed by the bore of the cylinder 1 and this deformation is made possible by the elastic nature of the plastics material from which the yoke is formed. The gaps between the flats 14a, 14b, 14c and 14d and the bore wall of the cylinder 1 can receive material deformed from the bearing areas.

Therefore, the yoke 5 contacts the bore wall of the cylinder 1 at four cirumferentially separated areas giving quadrangularity bearing support for the yoke and creating a substantially homogeneous loading strain of the bearing areas.

The head portion 9 of the yoke is spring urged against the rack bar 3 and variations in the spring load caused by vibrations of the rack bar are damped by the resultant friction of the deformed bearing areas 13a, 13b, 13c and 13d on the bore wall and also by deformations of the skirt 10 when bottomed on the rim end 12 of the cover 8. Since the coefficient of friction of the synthetic plastics yoke 5 on the metal of the cylinder 1 will increase as the speed of vibration causing displacement of the yoke in the bore increases, the resistance to vibration movements of the yoke is increased and the vibrations are damped. Because of the physical characteristics of the plastics material forming the yoke and the prestressing of this material in the bore of the cylinder 1, a shock absorber effect is obtained and vibrations transmitted to the yoke along the longitudinal axis of the rack bar 3 are absorbed. Further, transverse vibrations of the rack bar in a direction perpendicular to the axis of the yoke and rack bar are considerably diminished or damped because of the radial elasticity of the yoke. This radial elasticity is increased by providing a central axial orifice 15 through the head 9 and by providing blind end recesses or wells 16a and 16b on both sides of the orifice 15. These recesses 16a and 16b can be filled with lubricant to lubricate the rack bar sliding through the recess of the head which is shown as semicylindrical.

Since the yoke 5 is radially elastic and has constant bearing zones at four equally spaced areas on the bore wall of the cylinder, any transverse movement of the rack bar perpendicular to the axis of the piston is braked and damped and no noise or rattling will result from such movements of the rack bar. Any transverse movements or vibrations of the rack bar such as might be caused by the action of the driving pinion are also damped.

An advantage of the yoke 5 of this invention is its prestressing in the bore because in its free state it is larger than the bore. A wide range of tolerance variations in the bore diameter and the size of yoke are accommodated and manufacturing cost is decreased. The invention makes possible the elimination of machining of the bore of the cylinder and the fitting of the yoke in an unfinished bore as formed by casting. A rough cast pinion housing 2 from the foundry may even have a bore diameter varying along its length without causing the yoke to stick since the yoke has sufficient radial elasticity to accommodate such variations.

From the above descriptions it should thus be clear that this invention provides an improved rack and pinion assembly with a plastics yoke affording wide tolerance variations in manufacturing sizes of the components of the assembly and effective to absorb and damp out vibrations eliminating heretofore encountered noises.

I claim as my invention:

1. A rack and pinion assembly comprising a housing, a pinion gear rotatably mounted in said housing, a rack bar extending through said housing in meshing engagement with said pinion gear and adapted to be reciprocally driven thereby, an elastically deformable bearing located opposite said pinion gear and supporting said rack bar, spring means urging said bearing into engagement with said rack bar with a force normally maintaining said rack bar in meshing engagement with said pinion gear, said housing having a generally cylindrical bore slidably supporting said bearing, and said bearing having alternate portions with dimensions greater and lesser than the diameter of said bore with the greater portions radially elastically deformed into frictional engagement with the wall of the bore, permitting movement thereof towards the rack bar under the influence of the spring and frictionally dampening movement away from the rack bar under loads applied thereto by the rack bar.

2. The rack and pinion assembly of claim 1 wherein said bearing has a head with axial bores increasing the radially elasticity of the bearing.

3. The rack and pinion assembly of claim 1 wherein the bearing has a recessed head embracing the rack bar and a hollow skirt depending from said head.

4. The rack and pinion assembly of claim 1 wherein the alternate portions of the bearing include four circumferentially spaced rounded boss portions having a diameter greater than the diameter of the bore of the housing and providing a substantially homogenous loading strain of the bearing areas.

5. The assembly of claim 1 wherein the yoke has four bearing portions in equally circumferentially spaced relation and the alternate portions are flat.

6. A rack and pinion assembly comprising a pinion housing, a toothed pinion rotatably mounted in said housing, a rack bar slidable through the housing with rack teeth in meshed engagement with the pinion teeth, said housing having a bore on the side thereof opposite the pinion, a resilient plastics yoke slidable in said bore of the housing and having a recess slidably supporting the rack bar on the side thereof remote from the pinion, means in said bore of the housing urging the yoke toward the pinion to hold the rack bar in meshed engagement with the pinion, said yoke having bearing portions of greater diameter than said bore of the housing alternating with portions of lesser diameter than said bore of the housing, and said greater diameter portions being deformed by the bore of the housing into gaps between the lesser diameter portions and the bore of the housing to provide an interference fit preventing lateral displacement of the yoke in the bore and dampening vibrations transmitted to the yoke by the rack bar.

7. The assembly of claim 6 wherein said bore of the housing is unfinished.

8. The assembly of claim 6 wherein the yoke has a head embracing the rack bar, a hollow skirt depending from the head, and the housing has a closure for the bore bottoming the skirt to limit movement of the yoke away from the pinion.

9. The assembly of claim 6 wherein the yoke has a head with a recess slidably receiving the rack bar and lubricant chambers are provided in the recess to lubricate the rack bar.

10. The assembly of claim 6 wherein the bearing portions of greater diameter than the bore of the housing are arranged in diametrically opposite pairs to provide a substantially homogenous loading strain on the bearing areas by said bore.

11. The assembly of claim 6 wherein the yoke is composed of a rigid and somewhat elastic plastics material selected from the group of polyurethanes, polyethylenes, and acetal resins and has a head slidably receiving the rack bar with bores therein increasing the radial elasticity of the yoke.

* * * * *